(12) United States Patent
Chiang et al.

(10) Patent No.: US 8,126,247 B2
(45) Date of Patent: Feb. 28, 2012

(54) IMAGE PREPROCESSING SYSTEM FOR 3D IMAGE DATABASE CONSTRUCTION

(75) Inventors: Ann-Shyn Chiang, Hsin Chu (TW); Ping-Chang Lee, Taipei (TW); Yu-Tai Ching, Hsinchu (TW); Chao-Jun Zhuang, Hsinchu (TW); Hsiu-Ming Chang, Hsin Chu (TW); Yung-Chang Chen, Hsin Chu (TW); Chang-Huain Hsieh, Hsinchu (TW)

(73) Assignee: National Tsing Hua University, Hsin Chu (TW)

( * ) Notice: Subject to any disclaimer, the term of this patent is extended or adjusted under 35 U.S.C. 154(b) by 414 days.

(21) Appl. No.: 12/468,448

(22) Filed: May 19, 2009

(65) Prior Publication Data

US 2010/0296712 A1 Nov. 25, 2010

(51) Int. Cl.
*G06K 9/54* (2006.01)
(52) U.S. Cl. .................................. 382/131; 382/305
(58) Field of Classification Search .................. 382/131, 382/254, 276, 305
See application file for complete search history.

(56) References Cited

U.S. PATENT DOCUMENTS 6,075,905 A * 6/2000 Herman et al. ............... 382/284
6,472,216 B1 10/2002 Chiang
2007/0020599 A1 1/2007 Chiang et al.
2009/0046909 A1* 2/2009 Rutenberg et al. ............ 382/128
2009/0118600 A1* 5/2009 Ortiz et al. .................... 600/306

OTHER PUBLICATIONS

Mueller et al. "Image Interpolation Using Classification and Stitching." IEEE, 2008. pp. 901-904.*
Sai Prasad Raya and Jayaram K. Udupa, Shape-Based Interpolation of Multidimensional Objects, IEEE Transactions on Medical Imaging, vol. 9, No. 1, Mar. 1990, pp. 32-42.
Peter J. Burt and Edward H. Adelson, A Multiresolution Spline With Application to Image Mosaics, ACM Transactions on Graphics, vol. 2, No. 4, Oct. 1983, pp. 217-236.
Chris Pudney, Distance-Ordered Homotopic Thinning: A Skeletonization Algroithm for 3D Digital Images, Biomedical Confocal Microscopy Research Centre, Department of Pharmacology, The University of Western Australia, Nedlands, WA 6904, Australia, pp. 404-413.

* cited by examiner

*Primary Examiner* — Wensing Kuo
(74) *Attorney, Agent, or Firm* — Muncy, Geissler, Olds & Lowe, PLLC

(57) ABSTRACT

The present invention discloses an image preprocessing system, which includes a processing unit; an image preprocessing unit coupled to the processing unit to preprocess image slice data, wherein the image preprocessing unit includes an image fusion module to estimate missing values between different image slice data and an image stitching module to stitch different image slice data into stitched image data; and a database coupled to the processing unit to store the preprocessed image slice data.

12 Claims, 16 Drawing Sheets

TABLE I
COMPARISON OF RESULTS

| Original Slice | Linear Interpolation | Shape-based Interpolation | New Method |
|---|---|---|---|
|  Skull 0126 | | | |
|  Skull 0127 |  Linear 0127 |  Shape 0127 |  New 0127 |
|  Skull 0128 |  Linear 0128 |  Shape 0128 |  New 0128 |
|  Skull 0129 |  Linear 0129 |  Shape 0129 |  New 0129 |
|  Skull 0130 | | | |

COMPARISON OF RESULTS

| Methods | | Linear Interpolation | Shape-based Interpolation | Modified method NN | Modified method Object |
|---|---|---|---|---|---|
| $Msd(i)$ | 127 | 13.3184 | 45.4411 | 40.93 | 8.78209 |
| | 128 | 18.7847 | 48.415 | 37.10414 | 10.90492 |
| | 129 | 12.4516 | 42.7582 | 37.3308 | 8.09207 |
| $Nsd(i)$ | 127 | 36172 | 34908 | 28781 | 7875 |
| | 128 | 38162 | 34717 | 28536 | 14489 |
| | 129 | 36201 | 34760 | 28829 | 7619 |
| $Ldi(i)$ | 127 | 60 | 118 | 118 | 49 |
| | 128 | 64 | 66 | 66 | 66 |
| | 129 | 52 | 111 | 111 | 72 |
| $Tsdi(i)$ | 127 | 46058 | 87496 | 160357 | -31513 |
| | 128 | 16929 | -150291 | -1063 | -10929 |
| | 129 | 45625 | 80056 | 156067 | -35596 |
| $Tudi(i)$ | 127 | 154302 | 244026 | 205065 | 160051 |
| | 128 | 175537 | 224531 | 89117 | 165169 |
| | 129 | 152715 | 241308 | 200211 | 146318 |

Fig. 8

TABLE III
COMPARISON OF RESULTS

| Original Slice | Linear Interpolation | Shape-based Interpolation | New Method |
|---|---|---|---|
|  *Foot 0126* | | | |
|  *Foot 0127* |  *Linear 0127* |  *Shape 0127* |  *New 0127* |
|  *Foot 0128* |  *Linear 0128* |  *Shape 0128* |  *New 0128* |
|  *Foot 0129* |  *Linear 0129* |  *Shape 0129* |  *New 0129* |
|  *Foot 0130* |  *Linear 0130* |  *Shape 0130* |  *New 0130* |
|  *Foot 0131* |  *Linear 0131* |  *Shape 0131* |  *New 0131* |
|  *Foot 0132* | | | |

COMPARISON OF RESULTS

| Methods | | Linear Interpolation | Shape-based Interpolation | Modified method NN | Modified method Object |
|---|---|---|---|---|---|
| Msd(i) | 127 | 167.136 | 213.229 | 164.891 | 152.6652 |
| | 128 | 393.913 | 383.125 | 329.144 | 237.265 |
| | 129 | 450.51 | 498.57 | 459.485 | 353.925 |
| | 130 | 366.663 | 508.064 | 475.015 | 388.242 |
| | 131 | 166.015 | 393.656 | 374.736 | 301.248 |
| Nsd(i) | 127 | 21833 | 22274 | 15388 | 10767 |
| | 128 | 22472 | 22258 | 15638 | 12562 |
| | 129 | 22438 | 22303 | 16133 | 12855 |
| | 130 | 22215 | 22222 | 16083 | 12927 |
| | 131 | 21709 | 22192 | 16493 | 12769 |
| Ldi(i) | 127 | 184 | 194 | 194 | 183 |
| | 128 | 228 | 207 | 207 | 207 |
| | 129 | 212 | 222 | 222 | 201 |
| | 130 | 208 | 245 | 200 | 200 |
| | 131 | 177 | 195 | 189 | 189 |
| Tsdi(i) | 127 | 43123 | 107749 | 237640 | 55256 |
| | 128 | 74191 | 187601 | 315941 | 131749 |
| | 129 | 101222 | 264926 | 376106 | 180688 |
| | 130 | 96359 | 283984 | 385929 | 200902 |
| | 131 | 70710 | 275179 | 362048 | 180500 |
| Tudi(i) | 127 | 317895 | 436781 | 335478 | 172904 |
| | 128 | 462475 | 515391 | 413367 | 247819 |
| | 129 | 496032 | 557540 | 472884 | 296362 |
| | 130 | 455321 | 558134 | 482465 | 316424 |
| | 131 | 319694 | 515251 | 457766 | 296144 |

IMAGE PREPROCESSING SYSTEM FOR 3D IMAGE DATABASE CONSTRUCTION

FIELD OF THE INVENTION

The present invention relates to image processing and more particularly to an image data preprocessing system for the construction of an image database.

BACKGROUND OF THE INVENTION

Magnetic resonance imaging uses the nuclear magnetic resonance (NMR) phenomenon to produce images. When a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_t$. A signal is emitted by the excited spins, and after the excitation signal $B_1$ is terminated, this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradients vary according to the particular localization method being used. Each measurement is referred to in the art as a "view" and the number of views determines the quality of the image. The resulting set of received NMR signals, or views, or k-space samples, are digitized and processed to reconstruct the image using one of many well known reconstruction techniques.

Projection reconstruction methods have been known since the inception of magnetic resonance imaging. Rather than sampling k-space in a rectilinear, or Cartesian, scan pattern as is done in Fourier imaging, projection reconstruction methods sample k-space with a series of views that sample radial lines extending outward from the center of k-space. If an insufficient number of views are acquired, streak artifacts are produced in the reconstructed image.

In addition to the aforementioned image acquisition protocol, with sensors rotating around the object for multi-angle views subjected to reconstruction, a new protocol was introduced to acquire multi-slices of images through confocal microscopy, for example the U.S. application Ser. No. 11/169,890, entitled "Bio-Expression System and The Method of The Same." Such a methodology is appropriate for the acquisition of high resolution bioimages at the cellular level and for the reconstruction of a 3D cellular network, such as in the brain, so as to study the physiology or pathology of the organ. It is therefore a plausible task to reconstruct the whole neural network in the brain by systematic collections of different neurons in the whole brain and a rational reassignment of their proper position in a standard brain model system with coordinate reference. In other words, a 3D image database for neurons in the whole brain is feasible if all 3D neuronal images have been arranged with algorithms of anatomical significance. This is especially true when the technique mentioned in the U.S. Pat. No. 6,472,216 B1, filed on Oct. 29, 2002, entitled "Aqueous Tissue Clearing Solution" is employed in conjunction. However, there are tens of millions (in Drosophila) or even billions (in human) of neural images that need to be processed for the circuitry construction. A repertoire of algorithms for coherent 3D image data preprocessing is critical for the consistency of neural images categorized in the database.

Nerve tissue in human beings and other creatures, such as insects, includes neurons with elongated axonal portions arranged to form neural fibers or fiber bundles along which electrochemical signals are transmitted. In the brain, for example, functional areas defined by very high neural densities are typically linked by structurally complex neural networks of axonal fiber bundles. Tracts of neural fibers are therefore significantly relevant to functions associated with brain regions Diagnosis of neural diseases, planning for brain surgery, and other neurologically related clinical activities as well as research activities on brain functioning can benefit from detailed anatomical information such as tracking of the axonal fibers and fiber bundles.

Therefore, the present invention provides a novel image preprocessing system to establish a 3D brain image database for research or possible clinical applications.

SUMMARY OF THE INVENTION

In one aspect of the present invention, an image preprocessing system includes a processing unit; an image preprocessing unit coupled to the processing unit to preprocess image slice data, wherein the image preprocessing unit includes an image fusion module to estimate missing values between different image slice data and an image stitching module to stitch different image slice data into stitched image data; and a database coupled to the processing unit to store the preprocessed image slice data.

The aforementioned image preprocessing unit further includes a standardizing module to generate a standard coordinate for the stitched image data, an automatic aligning module to align the stitched image data with a standard image, and a neuronal tracing module to trace centerlines of neurons in the stitched image data.

One advantage of the present invention is that the image preprocessing system can establish a 3D neural image database for a whole brain in insects, e.g. for *Drosophila melanogater*.

Another advantage of the present invention is that the image preprocessing system can facilitate the progress of brain researches in terms of cellular neural networks, which may be integrated into functional modules.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the Claims and wherein:

FIG. 8 illustrates the quantitative measurements of the experimental results according to the aforementioned five formulas in accordance with the present invention;

FIG. 10 illustrates the quantitative results of evaluation in accordance with the present invention;

FIG. 12a illustrates down-sampled images arranged in order in accordance with the present invention;

FIG. 12b illustrates correlation computation pixel by pixel, wherein dotted lines mark the search range of B in accordance with the present invention;

DETAILED DESCRIPTION OF THE PREFERRED EMBODIMENT

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

Figure 1:
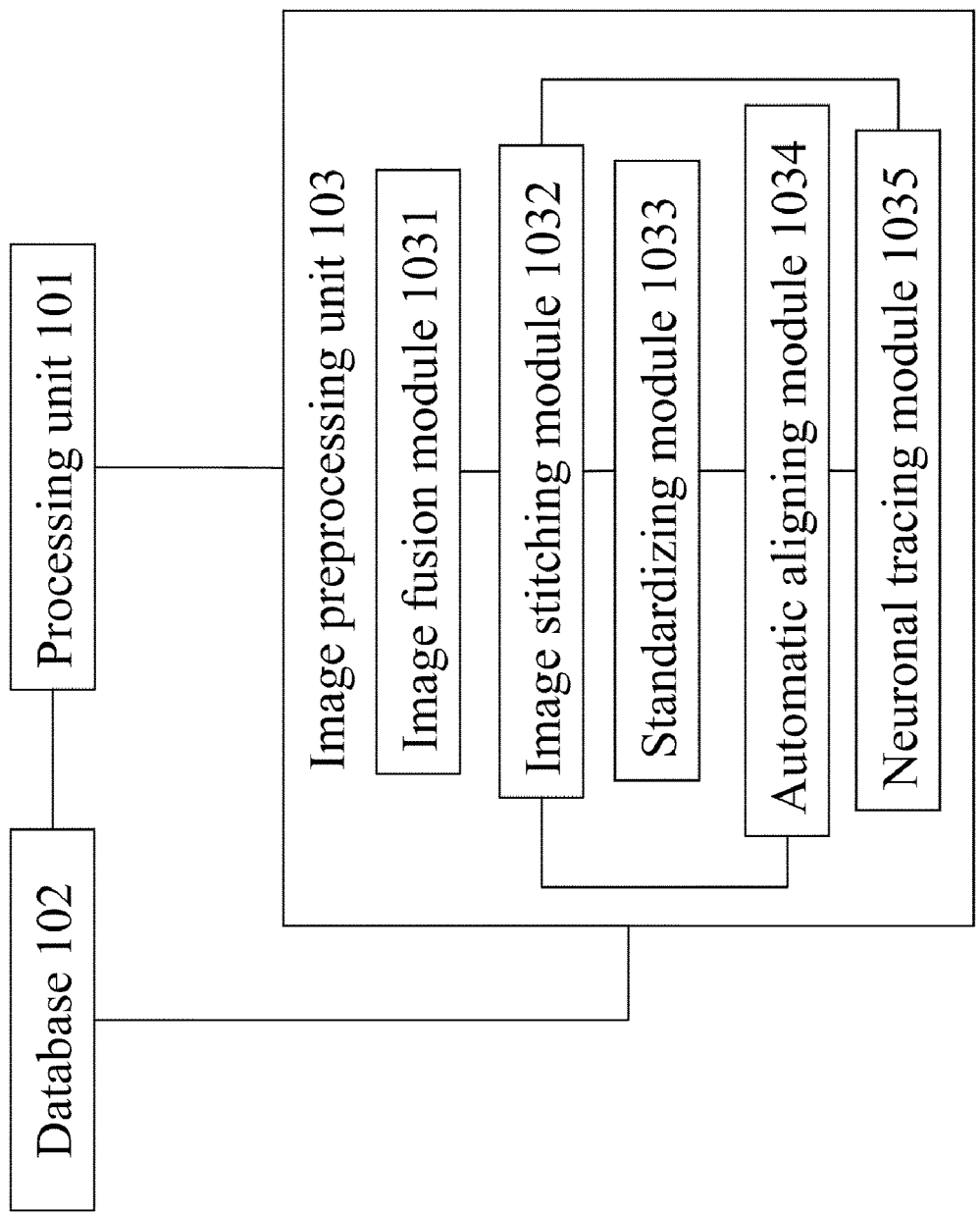
FIG. 1 is a block diagram of an image preprocessing system in accordance with the present invention.

The present invention discloses an image preprocessing system. With reference to FIG. 1, the image preprocessing system 10 of the present invention includes a processing unit 101, for example a central processing unit (CPU), a database 102, and an image preprocessing unit 103. As shown in FIG. 1, the database 102 and the image preprocessing unit 103 are coupled to the processing unit 101 respectively. Some other elements, for instance, memory, flash, I/O are also required in the system. However, they are well known in the art and omitted herein to avoid obscuring the subject of the present invention. In a preferred embodiment of the present invention, the image preprocessing unit 103 includes an image fusion module 1031, an image stitching module 1032, a standardizing module 1033, an automatic aligning module 1034, and a neuronal tracing module 1035. The image preprocessing unit 103 is utilized to preprocess image slice data of a sample brain inputted from external sources, so as to output the preprocessed image slice data to the database 102. The database 102 is utilized to store the preprocessed image slice data of the sample brain, which are inputted from the image preprocessing unit 103. The image fusion module 1031 of the image preprocessing unit 103 is utilized to estimate missing values between different image slice data of the sample brain. The image stitching module 1032 of the image preprocessing unit 103 is utilized to stitch different image slice data of the sample brain whose images overlap in a predetermined degree into stitched image data. The standardizing module 1033 of the image preprocessing unit 103 is responsive to the data fed from the image stitching module 1032 and is utilized to generate a standard coordinate for the stitched image data. The automatic aligning module 1034 of the image preprocessing unit 103 is coupled to the standardizing module 1033 and is utilized to align the stitched image data with a standard image for example a standard brain model and combine the aligned image data with the standard coordinate generated by the standardizing module 1033. The neuronal tracing module 1035 of the image preprocessing unit 103 is utilized to trace the centerlines of neurons in the stitched image data. After the centerlines of the neurons are traced, the image data are output to the database 102.

Figure 2:
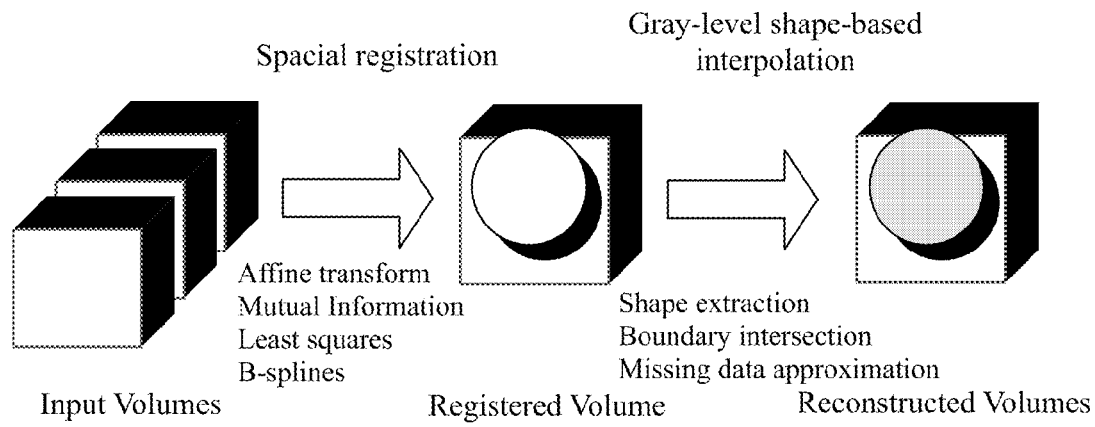
FIG. 2 illustrates a system overview of Registration-based Shape-Based Interpolation in accordance with the present invention.

In one embodiment of the present invention, the image fusion module 1031 utilizes a Registration-based Shape-Based Interpolation, which combines image registration with gray-level shape-based interpolation. Therefore, the image fusion module 1031 includes an image registration module and a gray-level shape-based interpolation module. Firstly, the same object is scanned from multiple directions to get three perpendicular non-uniform volumetric datasets. Secondly, these datasets are registered and applied with the aforementioned method, and the contributions from each scan are ensured to be properly merged into the final result. Experimental results, which will be described below, show that the aforementioned method is able to estimate missing values effectively. A framework is developed to reconstruct 3D models from multiple non-uniform volume datasets based on 3-D registration and gray-level shape-based interpolation. In this framework, a method for combining three volume datasets acquired from three different directions will be performed to produce a single high-resolution 3D model. The interpolation framework consists of a set of pre-processing techniques for initialization, which are then followed by the extraction of shape and calculation of final boundary and intensities, as shown in FIG. 2. In order to calculate the intensity value at a position in the interpolation plane, the following steps are taken: First, acquire three anisotropic volume datasets from three different directions. In the framework, these three directions are usually perpendicular to each other. Second, apply space transformation to these three volume datasets and register them. Third, extract the shape information of each volume and merge them to find appropriate boundaries for each gray-intensity. Then, the higher-resolution volume can be generated.

Registration

Figure 3:
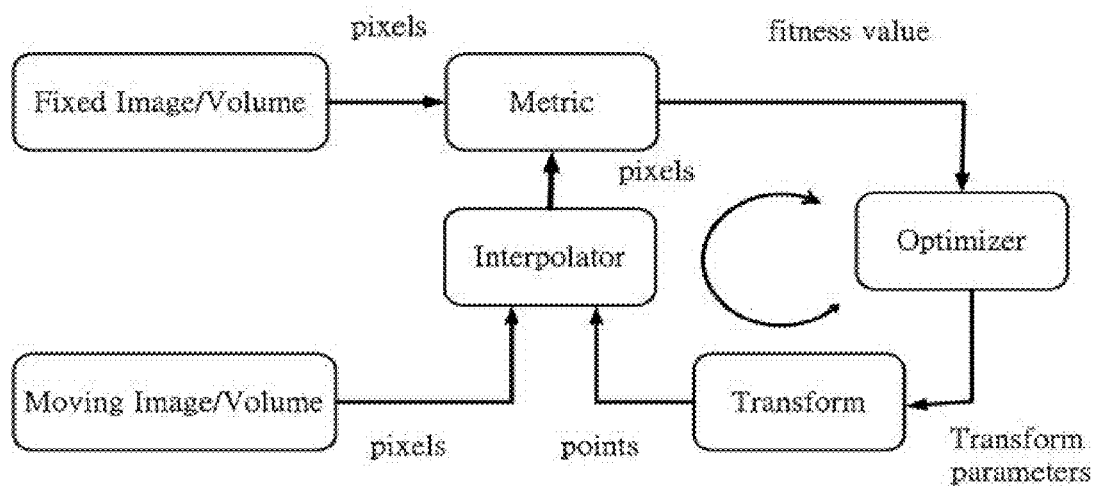
FIG. 3 illustrates the basic components of the image registration module in accordance with the present invention.

Image registration means the process for establishing spacial correspondence between features of two or more images. In the experiment, images were acquired by using the same modality and registration methods including mutual information in ITK (Insight Segmentation and Registration Toolkit). This method applies mutual information to assess the statistical dependence between image intensities of corresponding voxels in both images, which is considered maximum if images are aligned geometrically. The registration framework is shown in FIG. 3. The image registration module includes a metric component, an interpolator component, a transform component, and an optimizer component. It is an automatic, intensity-based measurement, which does not require the definition of landmarks or features. Mutual information, I(A,B), refer to "Equation (1)," measures the degree of dependence of A and B by measuring the distance between the joint distribution $P_{AB}(a,b)$ and the distribution associated to the case of complete independence $P_A(a) \cdot P_B(b)$ by means of the Kullback-Leibler measure.

$$I(A, B) = \sum_{a,b} P_{AB}(a, b) \log \frac{P_{AB}(a, b)}{P_A(a) \cdot P_B(b)} \quad (1)$$

Mutual information is related to entropy by "Equation (2)," where H(A), H(B) are the entropy of A and B respectively. H(A,B) means joint entropy and H(A|B) or H(B|A) represent conditional entropy of A given B or B given A. The MI (Mutual information) registration criterion states that the images are geometrically aligned by a spacial transformation, for which I(A,B) is maximal.

$$I(A,B)=H(A)+H(B)-H(A,B)=H(A)-H(A|B)=H(B)-H(B|A) \quad (2)$$

In FIG. 3, the metric component provides a measure of how well the fixed images are matched by the transformed moving images. The transform component represents the spatial mapping of points from the fixed image space to points in the moving image space. In this regard, affine transformation is applied to the transform component. The interpolator component is designed to evaluate moving image intensities at non-grid positions, and tri-linear interpolation is utilized here. The optimizer component is utilized to search certain parameters to reach maximal I(A,B) iteratively. By using above methods, three volumes are registered in the same coordinate system.

Modified Gray-Level Shape-Based Interpolation

Interpolation techniques could be divided into two categories: scene-based and object-based. Binary shape-based image interpolation method is firstly proposed by Raya and Udupa (S. P. Raya and J. K. Udupa, "Shape-based interpolation of multidimensional objects," IEEE Trans. Med. Imag., vol. 9, no. 1, pp. 32-42, March 1990). It belongs to object-based field. Unlike scene-based methods, which interpolate scene density values directly from the given scene, shape-based interpolation consists of several steps. The first step is to apply a distance transform to the pre-processed binary scene. After the transform mentioned above, each pixel is assigned a value which represents the shortest distance to the boundary between object and background. As known in the art, positive distance values are assigned to points inside the boundary and negative or zero distance values are assigned to the background. Then, these distance maps are interpolated through first-order or higher-order interpolation techniques in the second step. Finally, the interpolated distance map is converted back into binary scene by thresholding the distance map at zero. As a result, the non-zero points represent points inside the object. Six years later, Grevera and Udupa extended this method to multidimensional gray-level images, referring to "G. J. Grevera, J. K. Udupa. Shape-based interpolation of multidimensional grey-level images. IEEE Transactions on Medical Imaging, 15(6):881-892, 1996".

Figure 4:
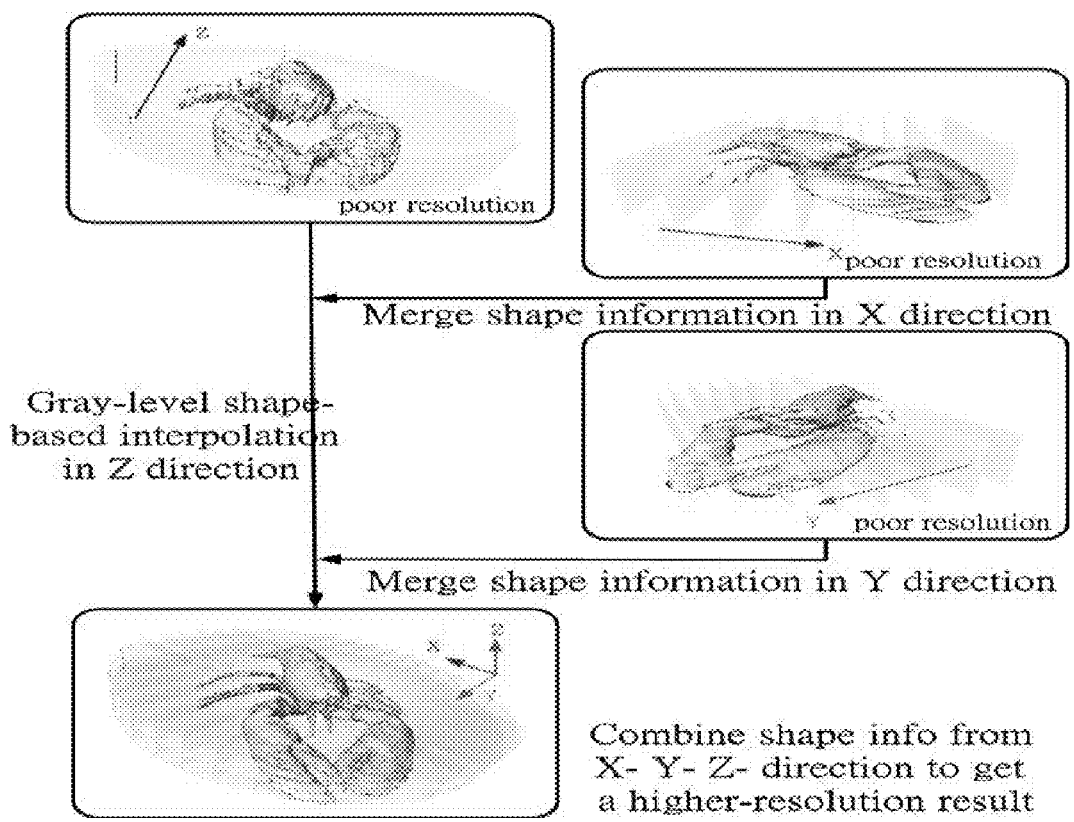
FIG. 4 illustrates the combination of gray-level shape-based interpolation in Z direction with the two additional shape information extracted from X and Y directions in accordance with the present invention.

In the present invention, Udupa's method is modified by gathering additional information of volumes acquired from the other two perpendicular directions. In other words, Udupa's gray-level shape-based interpolation method in the z direction is implemented firstly. Then, the other two non-uniform datasets which are scanned from x-direction and y-direction are acquired and 3D Euclidean distance transform is applied to them to extract their shape information. Finally, these three non-uniform datasets are combined to produce a higher-resolution result. FIG. 4 shows the overall procedures.

The gray-level shape-based interpolation algorithm in the present invention is outlined below.

Algorithm 1: PREPROCESSING(Vx, Vy, Vz)

Comment Vx, Vy, Vz are non-uniform samplings of object O with dim Dx, Dy, Dz Vy and Vz are registered to Vx do $\begin{cases} Vo(x, y, z) \leftarrow \text{generate a uniform sampling volume where} \\ x = sizeof(Dx), y = sizeof(Dy) \text{ and } z = sizeof(Dz) \\ \text{for } d \leftarrow z \\ \text{do } Vo(x, y, z) \leftarrow Vd(x, y, z) \\ endfor \\ \text{for } d \leftarrow x, y \\ \text{register } Vd \text{ to } Vo \\ \text{do } Vo(x, y, z) \leftarrow Vd(x, y, z) \\ endfor \end{cases}$ return(registered volume Vo)

Algorithm 1 generates a 3D array whose dimensions are identical to original x-,y-,z-dimension of the object in order to hold all the values in the three non-uniform volume data. Before saving the intensity of each volume to Vo, Vx and Vy are registered to Vz and the values are arranged to the corresponding positions in Vo.

```
Algorithm 2: INTERPOLATION (Vx, Vy, Vz)
Comment: Apply 2D gray-level shape-based interpolation to Vz and get Sz.
         Apply 3D Euclidean distance transform to Vx and Vy and get Sx, Sy.
         Then merge information from Sx, Sy, Sz.

do ⎧ for z_L ≠ z_H
   │   Vz_L (x, y, z_L) ← Vo(x, y, z_L) where Vz_L (x, y, z_L) means lower slice
   │   Vz_H (x, y, z_H) ← Vo(x, y, z_H) where Vz_H (x, y, z_H) means upper slice
   │     ⎧ for all x ∈ [0 ... Dx] y ∈ [0...Dy] z = z_L and z_H
   │     ⎨ T_min ← T_min ≤ Vz_L (x, y, z_L) and Vz_H (x, y, z_H)
   │     ⎩ T_max ← T_max ≥ Vz_L (x, y, z_L) and Vz_H (x, y, z_H)
   │   Vx, Vy ← Resampled to Dimension (Dx, Dy, Dz) by interpolation
   │   for t ∈ [T_min ... T_max]
   │   do ⎧ Vz_L, Vz_H, Vx, Vy ← threshold = t
   │      │   ⎧ for each x, y ∈ Vz_L, Vz_H
   │      │   ⎨ do ⎧ Vz_L ← 2DDT (Vz_L) Apply 3 × 3 chamfer distance method
   │      │   ⎩    ⎩ Vz_H ← 2DDT (Vz_H) Apply 3 × 3 chamfer distance method
   │      │       Vz_M ← Average of 2DDT (Vz_L) and 2DDT (Vz_H)
   │      │             where z_L < z_M < z_H
   │      │   ⎧ for each x, y, z ∈ Vx, Vy
   │      │   ⎨ do ⎧ Vx ← 3DDT (Vx) Apply 3D Euclidean distance transform
   │      │   ⎩    ⎩ Vy ← 3DDT (Vy) Apply 3D Euclidean distance transform
   │      │   Sz_M ← for all x ∈ [0 ... Dx] y ∈ [0 ... Dy]
   │      │          extract shape of Vz_M where Vz_M (x, y, z_M) ≥ 0
   │      │   Sx, Sy ← for all x ∈ [0 ... Dx] y ∈ [0 ... Dy] z ∈ [0 ... Dz]
   │      │          extract shape of Vx and Vy
   │      │          where Vx(x, y, z) > 0 and Vy(x, y, z) > 0
   │      │   for all x ∈ [0 ... Dx] y ∈ [0 ... Dy] z ∈ [0 ... Dz]
   │      │   do ⎧ if (Sz_M (x, y, z_M)∩Sx(x, y, z_M)∩Sy(x, y, z_M)) true
   │      │      ⎩ I (x, y, z_M)++
   │      Vz_M ← I (x, y, z_M) Calculate gray-intensity in Vz_M
   │      Vo ← Vz_M (x, y, z_M) Accumulate Vz_M to Vo
   ⎩ return (merged volume Vo)
```

Algorithm 2 shows the overall procedures which are implemented. It is based on Grevera and Udupa's methods, but extends to higher resolution by the usage of other input sets. The approach consists of several steps:

1) Lifting: In dataset Vz slice $Vz_L$ and $Vz_H$ are chosen arbitrarily and then intermediate slice $Vz_M$ between them is calculated. In the lifting step the gray-level scene in slice $Vz_L$ and $Vz_H$ is converted into binary scene. Firstly the minimum Tmin and maximum Tmax gray-level in the entire scene are found. Then the scene is thresholded with each gray-level t that lies between Tmin and Tmax. For each pixel $(x,y,z_L)$ or $(x,y,z_H)$ with gray-level and $Vz_H(x,y,z_H)$, if $Vz_L(x,y,z_L) \geq t$ or $Vz_H(x,y,z_H) \geq t$ then they are assigned 1, otherwise 0.

2) Distance Transform: A 2D distance transformation is applied to the binary scene that comes out of previous step. The binary scene is converted into a distance map where the value of each pixel represents the minimal distance from the pixel to the boundary. A 3-by-3 chamfer distance method is utilized to better approximate the Euclidean distance. Equation (3) shows the chamfer template of the first pass and Eqation (4) shows the template of the second pass.

$$Template_{Forward} = \begin{bmatrix} 14 & 10 & 14 \\ 10 & 0 & 0 \\ 0 & 0 & 0 \end{bmatrix} \quad (3)$$

$$Template_{Backward} = \begin{bmatrix} 0 & 0 & 0 \\ 0 & 0 & 10 \\ 14 & 10 & 14 \end{bmatrix} \quad (4)$$

3) 3D Euclidean Distance Transform:3D distance transform algorithm is used in this step.

```
Algorithm 3: DISTANCE TRANSFORM
Comment:Forward Pass
for z ∈ [0 ... (Dz - 1)]
do ⎧ for y ∈ [0 ... (Dy - 1)]
   │ do ⎧ for x ∈ [0 ... (Dx - 1)]
   │    ⎩ do { V(x, y, z) ← inf_{∀i,j,k∈{-1,0,1}} ( V(x+i, y+j, z+k) + m(i, j, k) )

Comment:Backward Pass
for z ∈ [(Dz - 1) ... 0]
do ⎧ for y ∈ [(Dy - 1) ... 0]
   │ do ⎧ for x ∈ [(Dx - 1) ... 0]
   │    ⎩ do { V(x, y, z) ← inf_{∀i,j,k∈{-1,0,1}} ( V(x+i, y+j, z+k) + m(i, j, k) )
```

-continued $$Template_{Forward \atop z=0} = \begin{bmatrix} \sqrt{2} & 1 & \sqrt{2} \\ 1 & 0 & 0 \\ 0 & 0 & 0 \end{bmatrix},$$ (5)

$$Template_{Forward \atop z=-1} = \begin{bmatrix} \sqrt{3} & \sqrt{2} & \sqrt{3} \\ \sqrt{2} & 1 & \sqrt{2} \\ \sqrt{3} & \sqrt{2} & \sqrt{3} \end{bmatrix}$$

$$Template_{Backward \atop z=0} = \begin{bmatrix} 0 & 0 & 0 \\ 0 & 0 & 1 \\ \sqrt{2} & 1 & \sqrt{2} \end{bmatrix},$$ (6)

$$Template_{Forward \atop z=1} = \begin{bmatrix} \sqrt{3} & \sqrt{2} & \sqrt{3} \\ \sqrt{2} & 1 & \sqrt{2} \\ \sqrt{3} & \sqrt{2} & \sqrt{3} \end{bmatrix}$$

Algorithm 3 is applied to the other two datasets Vx and Vy, which are thresholded by certain gray-value beforehand. Equation (5) and equation (6) are the forward and backward distance templates which are used. They are 3-by-3 templates in each z. Some prior arts increased other chamfer types, like 5-by-5 chamfer. It will have more precise result but is time consuming. In the implementation of the present invention, neighbor 26 voxels are taken into account to extract the feature points of the surface of Vx and Vy by 3D Euclidean distance transform and thresholding.

4) Interpolation: In step 2, the distance maps of $Vz_L(x,y,z_L)$ and $Vz_H(x,y,z_H)$ which contain many positive and negative numbers are calculated. According to Udupa's method, these points are classified into two categories. Then linear interpolation is applied to the two distance map and an intermediate distance map of $Vz_M(x,y,z_M)$ is obtained.

$$\left. \begin{array}{l} Vz_L(x,y,z_L) \text{ or} \\ Vz_H(x,y,z_H) \end{array} \right\} = \begin{cases} \text{positive value} \longrightarrow (x,y) \text{ is interior} \\ \text{negative value} \longrightarrow (x,y) \text{ is exterior} \end{cases}$$ (7)

5) Conversion to binary: In step 3 and step 4 mentioned above, the $Vz_M(x,y,z_M)$ has been successfully acquired in the form of distance map. Now the distance values are classified into binary values to represent object or background. Generally positive values are regarded as object, and negative values are regarded as background. Because of direct interpolation of lower and upper distance maps of $Vz_L(x,y,z_L)$ and $Vz_H(x,y,z_H)$, value 0 may be got in the intermediate map. In order to solve this problem, two methods are utilized to decide what these points belong to. In method 1, the values of the neighbor 8 pixels around the pixel which is concerned are searched. If most of its neighbor pixels are positive, then it is assigned positive. If most of its neighbors are negative, then it represents background. In method 2, these 0 points are forced to be positive, i.e. interior object.

6) Intersection: After applying distance transformation and interpolation, shape information $Sz_M$ is obtained from $Vz_M(x,y,z_M)$ along with Sx from Vx and Sy from Vy. Now for any point $(x,y) \in Vz_M(x,y,z_M)$, their values are referred to shape attributes in Sx and Sy at the same position. If the equation $Sz_M(x,y,z_M) \cap Sx(x,y,z_M) \cap Sy(x,y,z_M)$ is true, the point $(x,y,z_M)$ belongs to interior object.

7) Collapsing: Steps 1-6 are repeated in sequence until all gray-level intensities are examined from Tmin to Tmax. By calculating these "true numbers" in each intensity threshold, a gray-level intermediate slice $Vz_M(x,y,z_M)$ could be reconstructed.

Experimental Results

Grevera and Udupa proposed five ways to compare the interpolation results with the original slice in a quantitative way. Most methods compare the gray-level $f_c(x,y,z)$ from correct intermediate slice, in other words, the answer, with the gray-level $f_i(x,y,z)$ from the interpolated slice. Three methods including scene-based linear interpolation, Udupa's gray-level shape-based interpolation and the modified interpolation method utilized by the image fusion module 1031 of the present invention are implemented. The criterions of verification are listed bellow:

1) Mean Squared Difference msd(i):

$$msd(i) = \frac{1}{N} \sum_{(x,y,z) \in i} [f_c(x,y,z) - f_i(x,y,z)]^2$$ (8)

2) Number of Sites of Disagreement nsd(i):

$$nsd(i) = \sum_{(x,y,z) \in i} \tau[|f_c(x,y,z) - f_i(x,y,z)|]$$ (9)

where $\tau(k) = \begin{cases} 1, & \text{if } k > \theta \text{ here we set } \theta = 1 \\ 0, & \text{otherwise} \end{cases}$ This counts the number of pixels where the gray level of the pixel in the original slice and the gray level in the interpolated slice differ more than value $\theta$ from each other.

3) Largest Difference ldi(i):

$$ldi(i) = \max_{(x,y,z) \in i} \{|f_c(x,y,z) - f_i(x,y,z)|\}$$ (10)

This criterion measures the largest difference between the gray-level from the original slice and the interpolated slice.

4) Total Signed Difference tsdi(i):

$$tsdi(i) = \sum_{(x,y,z) \in i} [f_c(x,y,z) - f_i(x,y,z)]$$ (11)

This criterion calculates the total difference. If the result is negative, the gray-values in the interpolated slice are estimated too high compared to the gray-values of the original slice. If it is positive, the gray-values in the estimated slice are too small to the original slice.

5) Total Unsigned Difference tudi(i):

$$tudi(i) = \sum_{(x,y,z) \in i} |f_c(x,y,z) - f_i(x,y,z)|$$ (12)

This criterion measures the total absolute difference between original slice and the interpolated slice. It shows how much the gray-values of the interpolated slice actually deviate from the gray-values in the original slice. Among above five methods, the mean squared difference and number of sites of disagreement are considered the most important as a comparative measure in image interpolation.

In the experiments, two datasets from tomography are utilized. They are human mandible data and human foot data, both of which are 256×256×256 8-bit gray-level images. The original volume datasets are sub-sampled and shifted in the x-, y- and z-directions respectively. Then these three datasets are registered and interpolated and the results are finally evaluated by the five criterions mentioned above.

Figure 5:
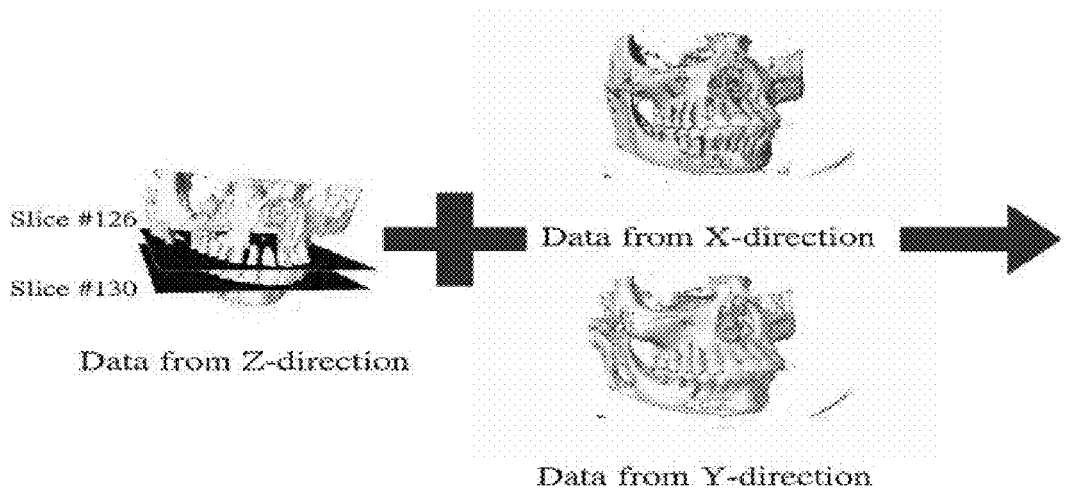
FIG. 5 illustrates the result of Experiment 1 regarding the image fusion module in accordance with the present invention.

1) Experiment 1: As shown in FIG. 5, the three human mandible datasets are registered firstly, and the 126th and the 130th in the z-direction are chosen for experiment. Four methods which are linear interpolation method, Udupa's gray-level shape-based interpolation method and the two modified shape-based interpolation methods utilized by the image fusion module 1031 of the present invention are carried out.

Figure 7:
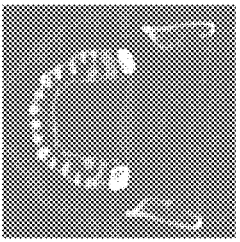
FIG. 7 illustrates the reconstruction results of Experiment 1 in accordance with the present invention.
Figure 7:
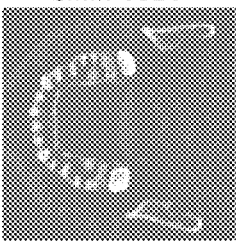
Figure 7:
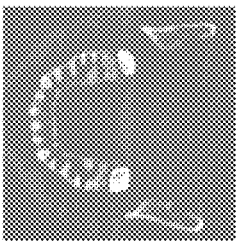
Figure 7:
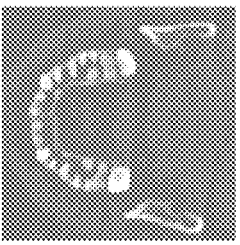
Figure 7:
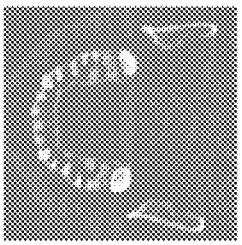
Figure 7:
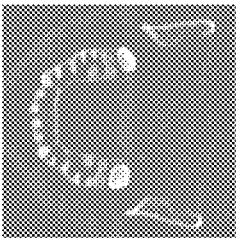
Figure 7:
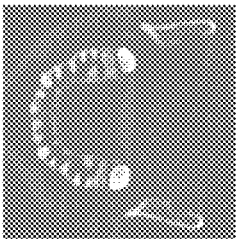
Figure 7:
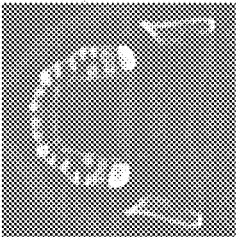
Figure 7:
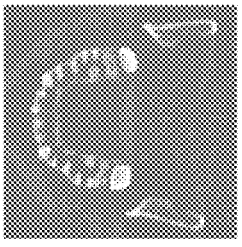
Figure 7:
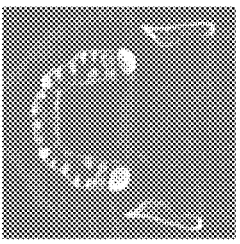
Figure 7:
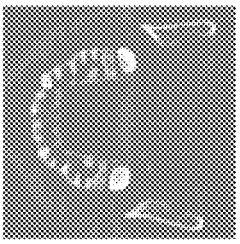
Figure 7:
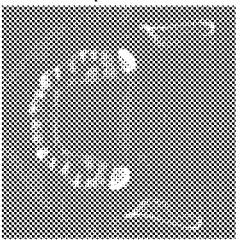
Figure 7:
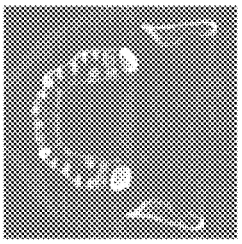
Figure 7:
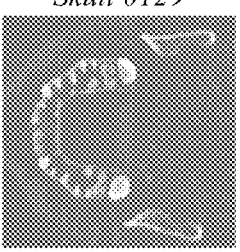

FIG. 7 shows the reconstruction results of the first experiment. The first column contains the original slices. The 126th slice and 130th slice are used as inputs, and the 127th~129th slices are used for evaluating the experimental outcomes. The reconstructed images calculated by linear interpolation method are placed on the second column. The third column displays the outcomes by using Udupa's method and the final column shows the results of the modified interpolation methods utilized by the image fusion module 1031 of the present invention.

FIG. 8 shows the quantitative measurements of the experimental results according to the aforementioned five formulas. For each interpolation method the 127th, 128th and 129th intermediate slices are compared. The first two evaluative formulas are considered as the most representative parts in the procedure of evaluation. As shown in FIG. 8, the 128th reconstructed slice has worse results than the 127th and 129th slices no matter what evaluative formula is applied. The main reason is that the farther the interpolated slice is from the inputs, the worse reconstructed image is got. The position of the 128th slice is in the middle place of the two inputs. For the sake of distance between the inputs, the 128th slice possesses more inaccuracies than the 127th or 129th slices. Because of merging additional information from the other two datasets, the modified interpolation methods utilized by the image fusion module 1031 of the present invention perform a little better than previous methods in experiment 1.

Figure 6:
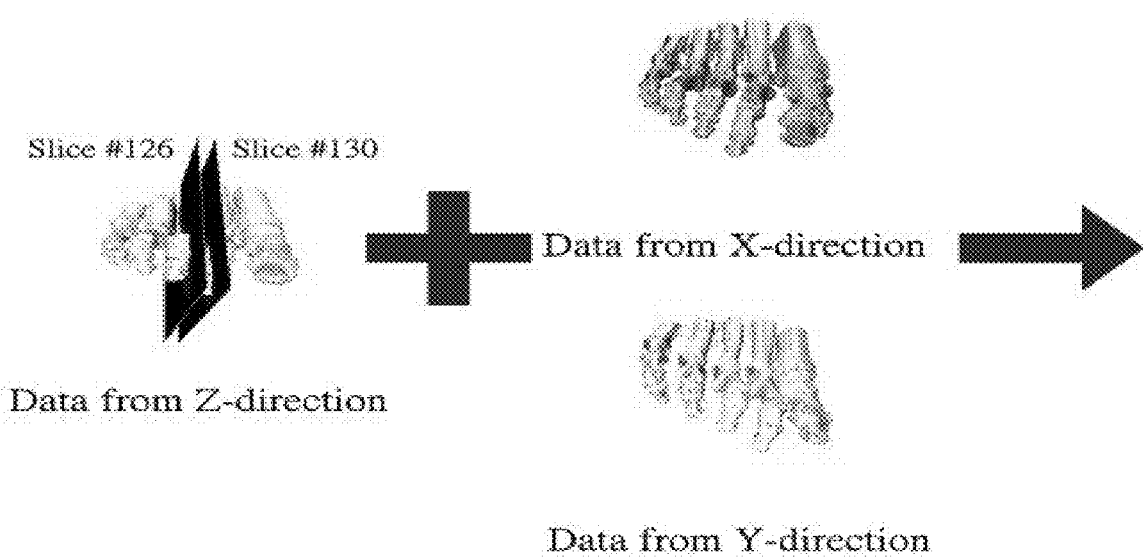
FIG. 6 illustrates the result of Experiment 2 regarding the image fusion module in accordance with the present invention.
Figure 9:
FIG. 9 illustrates the reconstructed images in Experiment 2 in accordance with the present invention.
Figure 9:
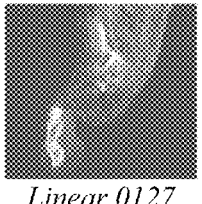
Figure 9:
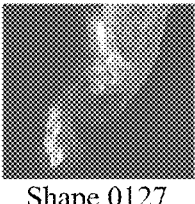
Figure 9:
Figure 9:
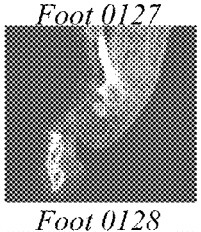
Figure 9:
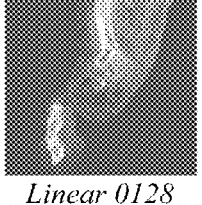
Figure 9:
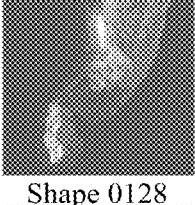
Figure 9:
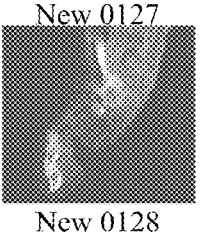
Figure 9:
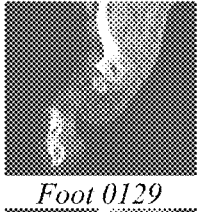
Figure 9:
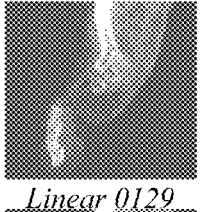
Figure 9:
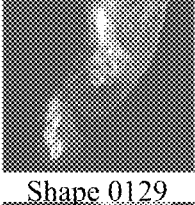
Figure 9:
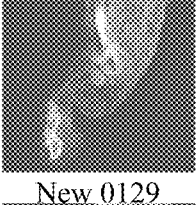
Figure 9:
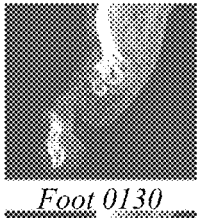
Figure 9:
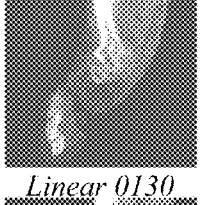
Figure 9:
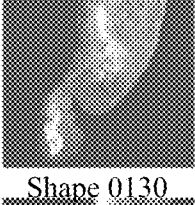
Figure 9:
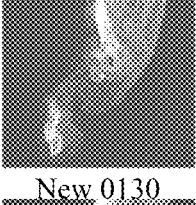
Figure 9:
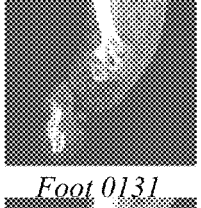
Figure 9:
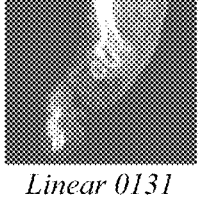
Figure 9:
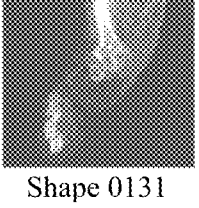
Figure 9:
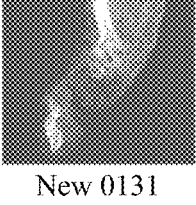
Figure 9:
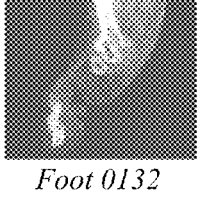
Figure 9:

2) Experiment 2: As shown in FIG. 6, the three human foot datasets are registered first, and the 126th and the 132th in the z-direction are chosen for experiment, wherein the distance between two inputs is larger than the distance in previous experiment. FIG. 9 shows the reconstructed images in the second experiment. Different from experiment 1, two slices which have larger distance therebetween are chosen. FIG. 10 shows the quantitative results of evaluation. The modified interpolation methods utilized by the image fusion module 1031 of the present invention still have more outstanding results than those of previous methods.

Figure 11:
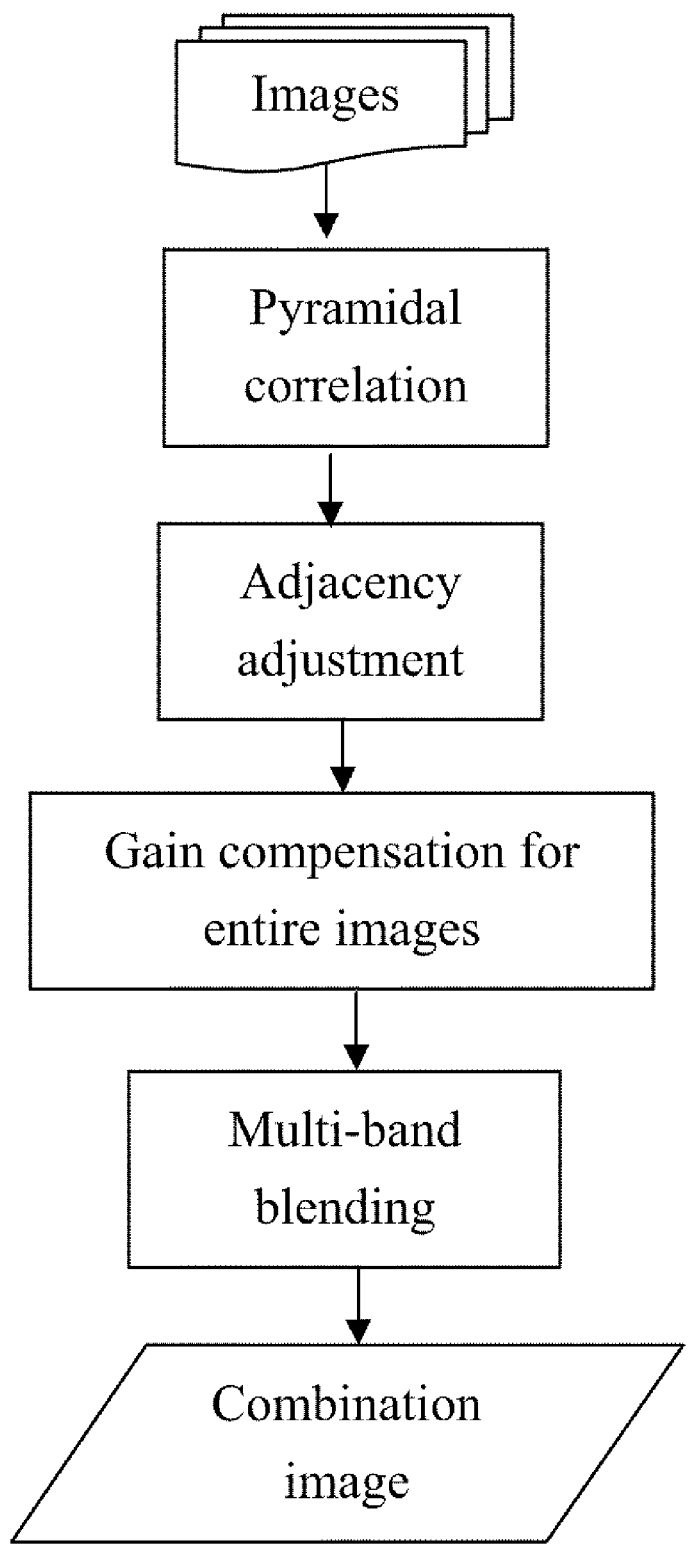
FIG. 11 illustrates the overall procedures of the image stitching module in accordance with the present invention.

In one embodiment of the present invention, the image stitching module 1032 utilizes a series of algorithms, which includes pyramidal correlation, adjacency adjustment, gain compensation for entire images, and multi-band blending, as shown in FIG. 11.

Pyramidal Correlation

Correlation computation yields a single number that describes the degree of matching relationship between two random variables. For two random variables X and Y, their data pairs are $(x_i, y_i)$, $i=1, 2, \ldots, n$. Its mean and variance are $\bar{x}$ and $s_X$, $\bar{y}$ and $s_Y$, respectively. Then correlation r is determined as $$r = \frac{1}{n-1} \sum_{i=1}^{n} \left( \frac{x_i - \bar{x}}{s_X} \right) \left( \frac{y_i - \bar{y}}{s_Y} \right) \quad (13)$$

Six variables (stand for six pictures) are considered at a time; a data matrix which is correlation matrix will be obtained.

Figure 12C:
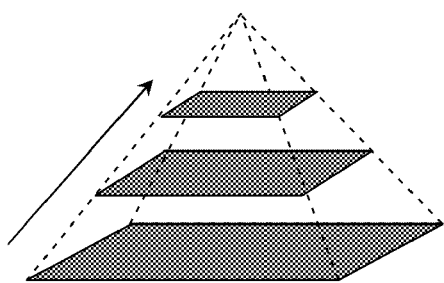
FIG. 12c illustrates mismatched result (left) and ideally matched result (right) in correlation in accordance with the present invention.
Figure 12C:
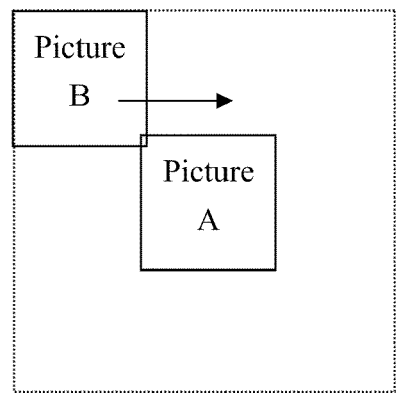
Figure 12C:
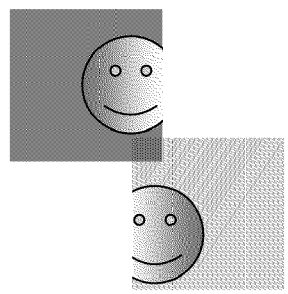
Figure 12C:
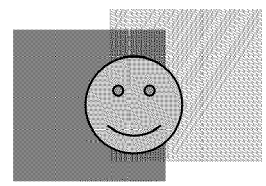
Figure 13:
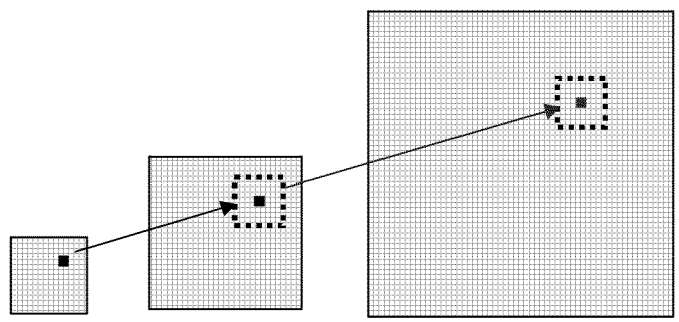
FIG. 13 illustrates search range of the next level (dashed line) in accordance with the present invention.

First of all, images are down-sampled into the smallest scale (FIG. 12a), which is the top level of the pyramid. By computing correlations with other pictures pixel by pixel (FIG. 12b) and eliminating irrational results (a threshold is added on variance $s_X$ and $s_Y$), the highest correlation could be obtained and it will be known that the relative position lies on the up-left corner. Then images are up-sampled to the next level, and searched within a reasonable range around the new position to refine the coordinates of the corner which is obtained before (FIG. 13). The procedure is repeated until the position of overlapping is found in the finest level.

Otherwise, this program only computes the upper triangle of the correlation matrix. In every correlation matrix there are two triangular parts that lie below and to the left of the diagonal (lower triangle) and above and to the right of the diagonal (upper triangle). The two triangles of a correlation matrix are always mirror images of each other (the correlation of variable x with variable y is always equal to the correlation of variable y with variable x).

TABLE 1

Correlation matrix (one of the experimental results)

| Img [0] | Img [1] | Img [2] | Img [3] | Img [4] | Img [5] |
|---|---|---|---|---|---|
| Img [0] | 0.930926 | 0.869357 | 0.463536 | 0.456217 | 0.898263 |
| Img [1] |  | 0.93184 | 0.576419 | 0.429544 | 0.581173 |
| Img [2] |  |  | 0.949069 | 0.536115 | 0.534995 |
| Img [3] |  |  |  | 0.917143 | 0.837898 |
| Img [4] |  |  |  |  | 0.913916 |
| Img [5] |  |  |  |  |  |

Highest correlation being first found after searching the entire correlation matrix (Table 1), then the first image pair which is the pair <Img[2], Img[3]> can be decided as shown in Table 1. The procedures are continued until all numbered (0~5) pictures have appeared in the image pair list (Table 2a). Each image pair represents not only that two images are adjacent, but also the relative positions of the pictures. During the process, all positions of images where they should be located in a combined image were decided (Table 2b).

TABLE 2a

Image pair list

| st | Img[2] | Img[3] |
| nd | Img[1] | Img[2] |
| rd | Img[0] | Img[1] |
| th | Img[3] | Img[4] |
| th | Img[4] | Img[5] |

TABLE 2b

| x-y coordinates of each picture (result of Table 1.) | |
| --- | --- |
| Img[0] | (10, 0) |
| Img[1] | (4, 798) |
| Img[2] | (0, 1253) |
| Img[3] | (730, 1259) |
| Img[4] | (739, 789) |
| Img[5] | (740, 26) |

Adjacency Adjustment

In pyramidal correlation, six slices are computed with all the same sequence number in six stacks and it is assumed that they are all at the same z-coordinate.

To solve the problem, a weight C which is the average of all correlations in the list of image pairs is defined. C is considered as a parameter which can tell how much the combination is likely to be on the same plane. By substituting adjacent pictures to have new combination, which one might be close to the desired set of six images on the same plane can be determined.

$$C = \frac{\sum_{all\ pairs\ in\ a\ image\ pair\ list} correlation\ of\ image\ pair}{number\ of\ image\ pairs} \quad (14)$$

| st | Img[2] | Img[3] |
| --- | --- | --- |
| nd | Img[1] | Img[2] |
| rd | Img[0] | Img[1] |
| th | Img[3] | Img[4] |
| th | Img[4] | Img[5] |

The advantage of the continuity can be utilized to start computing which combination is the desired result.

Figure 14A:
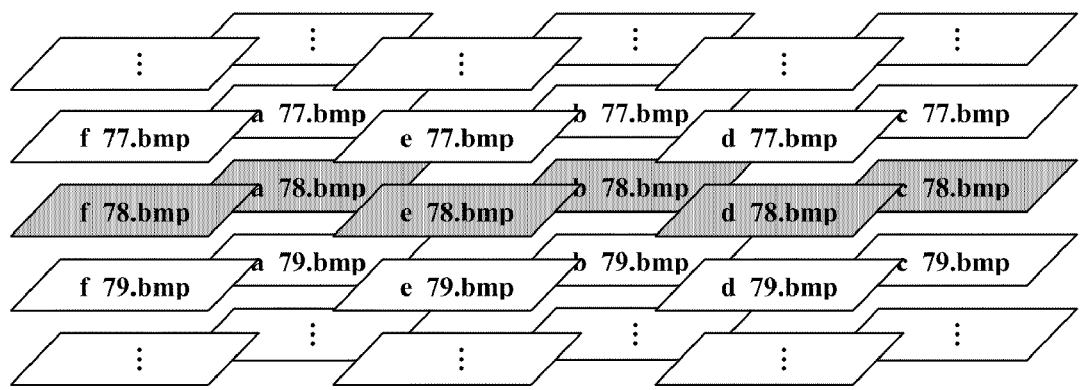
FIG. 14a illustrates the ideal relationships between stacks in accordance with the present invention.
Figure 14B:
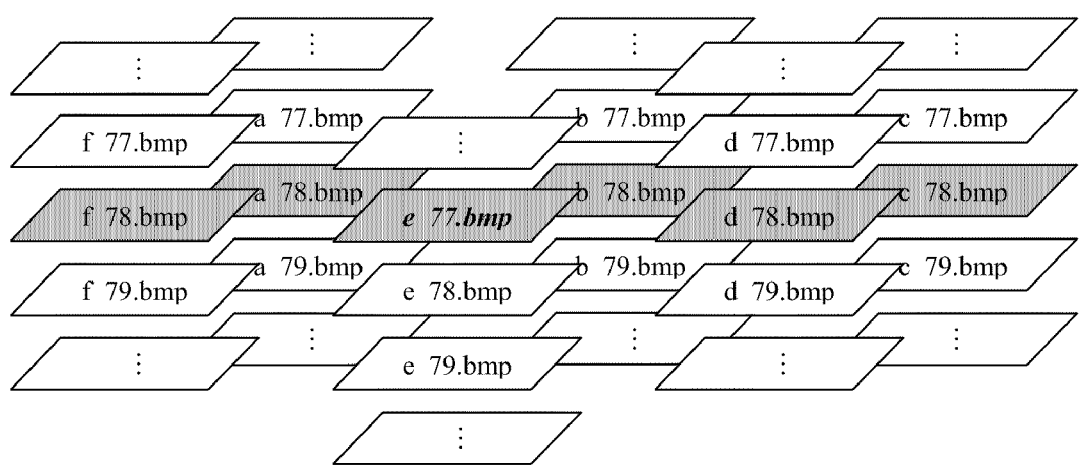
FIG. 14b illustrates the relationships between stacks in the experiment in accordance with the present invention.

The relative position of one of the combined results will be memorized and every slice of the fifth stack will be shifted in subsequent image-blending procedure. Taking the advantage of similar relationships among the stacks will save a lot of time to recompute the correlation of each pair of images for registration (FIGS. 14a and 14b).

Gain Compensation for Entire Images

The difference of the images is eliminated with their average intensities. The mean of each image is $$\bar{I}_k = \frac{\sum_{i=1}^{m}\sum_{j=1}^{n} I_k(i,j)}{m \times n} \quad k = 1 \ldots 6 \quad (15)$$

And the mean of all input images can be computed by $$\bar{I} = \frac{\sum_{k=1}^{6}\sum_{i_k=1}^{m_k}\sum_{j_k=1}^{n_k} I_k(i_k, j_k)}{\sum_{k=1}^{6} m_k \times n_k} \quad (16)$$

The intensity of each input image is adjusted as $$I'_k(i,j) = I_k(i,j) \times \frac{\bar{I}}{\bar{I}_k} \quad k = 1 \ldots 6 \quad (17)$$

With several tries it is chosen not to ignore the background nor to consider the overlap as special cases because of two reasons: first, ignoring the background or considering the overlaps would not give a good result in these cases; second, with or without ignoring the background or considering the overlaps would not affect the ratio of compensation too much. Even the two ratios would not differ a lot, Equations (4.4)~(4.6) are chosen since it is intended to have better results.

Multi-Band Blending

A simple approach to blending is to perform a weighted sum of the image intensities along each ray using weight functions. However, this approach can cause blurring of high frequency detail if there are small registration errors. To prevent the aforementioned problem, the multi-band blending algorithm described in Burt, P. and Adelson, E. 1983. A multiresolution spline with application to image mosaics. *ACM Transactions on Graphics*, 2(4):217-236 is utilized. The idea behind multi-band blending is to blend low frequencies over a large spatial range and high frequencies over a short range.

The steps to complete the method in the experiment are as follows:

1. Build a large mask[0] as the same size of the combination.
2. Define regions with overlaps as $I^{ov}$ and regions without overlaps as $I^{nov}$.
3. Pixels in $I^{nov}$ are labeled with the same number in the mask[0] as the index k(k=1~6) of Img[k].
4. Pixels in $I^{ov}$ are computed for the distance from the pixels set number in step 3, and set the same number in the mask[0] as the nearest one.
5. Build mask [1]~mask[6] as large as step 1, and fill the pixel in mask[i] (i=1~6) to one if this pixel in mask[0] is i. Otherwise, set this pixel to zero.
6. Smooth the six masks and six pictures using Gaussian filtering with different variance to create different bands.
7. Separate different band and multiply to the corresponding mask.
8. Add all bands together.

By applying these steps, the gradient of intensities is smoother and the seam between six images is not visible.

Experimental Results

Figure 15A:
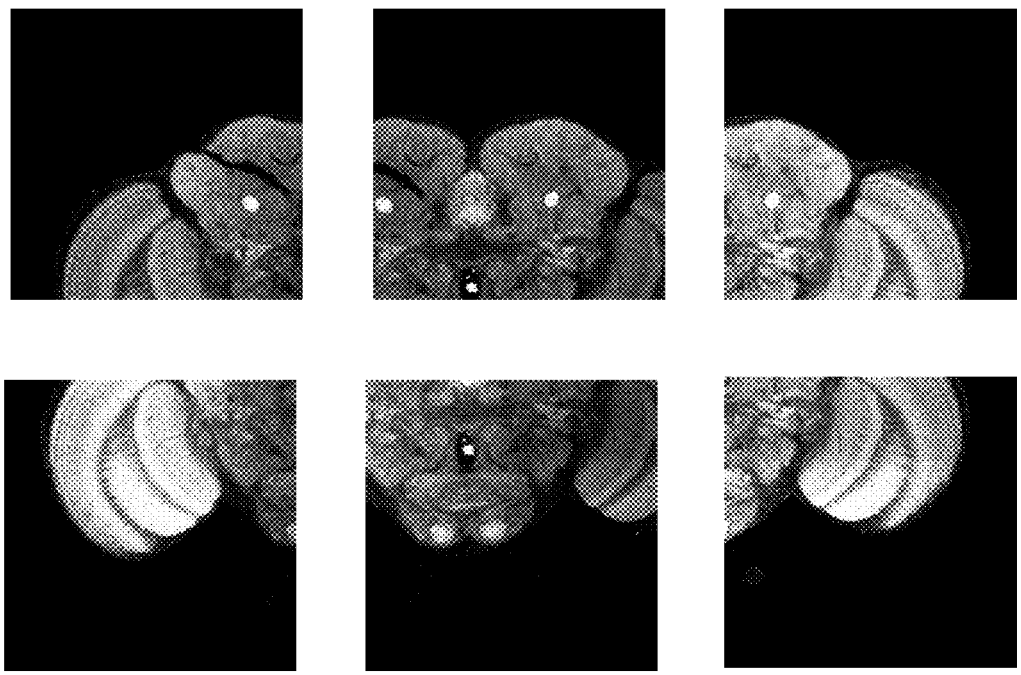
FIG. 15a illustrates the six input images in accordance with the present invention.
Figure 15B:
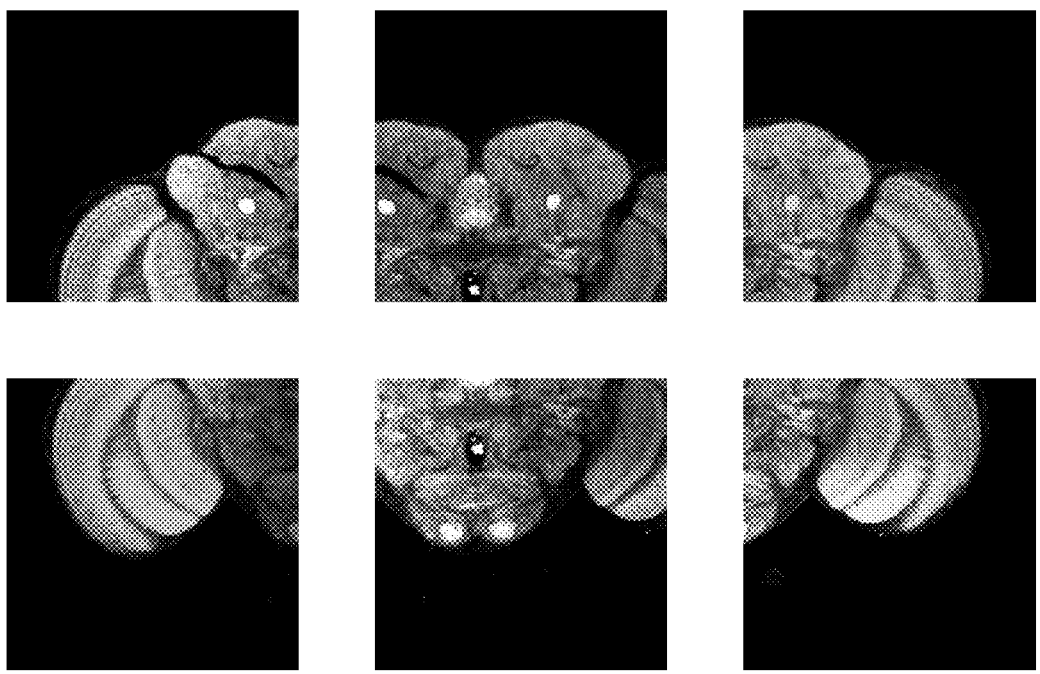
FIG. 15b illustrates the six input images after gain compensation in accordance with the present invention.
Figure 15C:
FIG. 15c illustrates the results after multi-band blending in accordance with the present invention.

In the experiment, the six input images utilized are shown in FIG. 15a. The six input images after gain compensation are shown in FIG. 15b. The results after multi-band blending are shown in FIG. 15c.

In one embodiment of the present invention, a standard brain model is established by the standardizing module 1033, which includes a process system used to process data; an average model generating module embedded in a computing system, wherein while an input of two-dimensional individual model sections is fed into the process system, the average model generating module is responsive to the input of two-dimensional individual model sections and is capable of processing an individual model construction and model-averaging procedure, thereby generating an average model from all the input datasets; a standardization database including a bio-expression sub-database, cellular network sub-database and bio-fine structure sub-database, wherein the standardization database is coupled to the process system to store at least the average model; and a module for creating standard brain model and coordinate system. The detailed descriptions of the standardizing module 1033 are referred to the U.S. application entitled "Bio-Expression System with Module for Creating the Standard *Drosophila* Brain Model and Its Coordinate System," Ser. No. 12/222,813, filed on Aug. 18, 2008, the disclosure of which is incorporated herein by reference in its entirety.

Figure 16A:
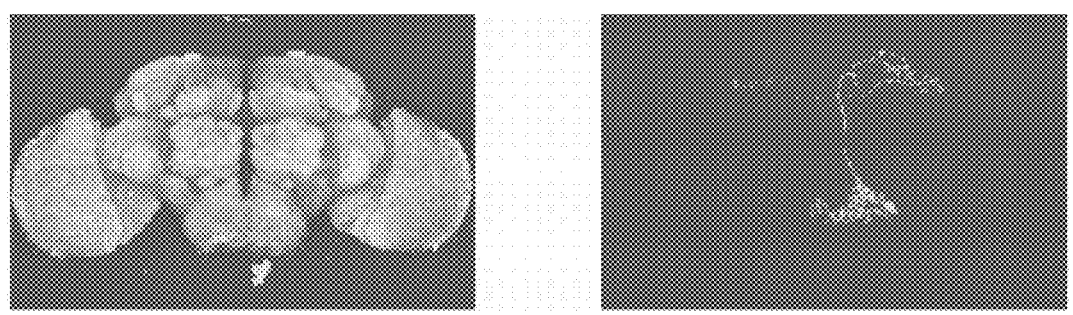
FIG. 16a illustrates the 3D brain images utilized in the automatic aligning procedures performed by the automatic aligning module in accordance with the present invention.
Figure 16B:
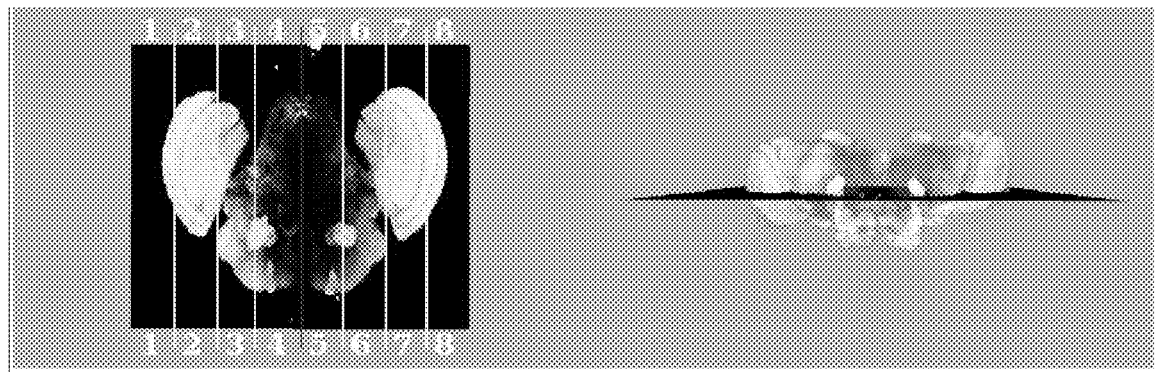
FIG. 16b illustrates the automatic aligning procedures performed by the automatic aligning module in accordance with the present invention.
Figure 16C:
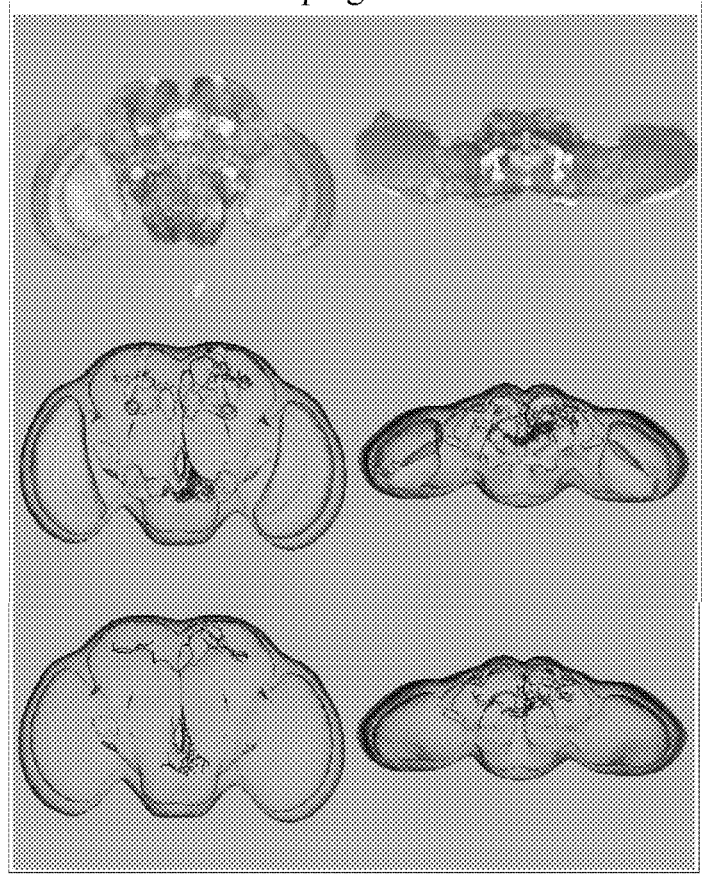
FIG. 16c illustrates the automatic aligning procedures performed by the automatic aligning module in accordance with the present invention.

In one embodiment of the present invention, the automatic aligning module 1034 performs a series of automatic aligning procedures. After a standard brain model is established, the partial or whole sample brain and its associated single neurons taken through two channels of different wavelength for example 633 nm wavelength and 488 nm wavelength are utilized as shown in FIG. 16*a*. In the automatic aligning procedures, with reference to FIG. 16*b*, the central position of the three-dimensional image of the contour of the sample brain is aligned with the central position of the standard brain model firstly. Then, the front portion of the contour of the sample brain is aligned with the front portion of the standard brain model, and the rear portion of the contour of the sample brain is aligned with the rear portion of the standard brain model. Subsequently, the orientation of the vision area of the contour of the sample brain is aligned with the orientation of the vision area of the standard brain model. Subsequently, with reference to FIG. 16*c*, a 3D affine transformation algorithm, for example with the aid of a commercial software, such as AMIRA, is applied to the results of the aforementioned procedure to warp the contour of the sample brain onto the standard brain model and the transformation is carried over to the neuron in the sample brain. The skeleton of the fiber is generated accordingly. The aforementioned automatic aligning procedure may be repeated if correction is necessary. The aforementioned automatic aligning procedure may be automated to deposit the neuron images from all sample brains in batch.

In one embodiment of the present invention, the neuronal tracing module 1035 utilizes an approximate minimal path method to extract the centerlines of neurons from 3-D image stack collected from a laser scanning confocal microscope based on the known global minimal path.

Pre-Processing

Since the spatial resolution of confocal microscopic images in the z-direction is much worse than the resolution in x and y directions, the images are pre-processed slice-by-slice first. Then, the minimal energy map is computed from the processed image stack.

For every slice a threshold is chosen based on its intensity histogram and the image slice is then binarized. A refined binary image stack, $V_b$, is then obtained. A 3-D 26-neighbor connected component analysis is applied. In most of the cases, the largest connected component is the desired neuron. Let V be the volume containing the binarized neuron. The Euclidean distance transform is then applied to each image slice in V and construct the skeletons, $S_k$, of every object in the foreground of slice k. For each slice k, a set of candidate 3-D end points are computed by examining 9 digital planes in the 26-neighborhood of each end point of $S_k$. The details of the algorithm are referred to C. Pudney "Distance-ordered homotopic thining: a skeletonization algorithm for 3D digital images," *Computer Vision and Image Understanding*, 72(3), pp. 404-413, 1998. The set of skeleton points in each slice plays an important role in designing the potential function. The set of candidate end points is denoted $E^0$.

Awarding Function and Minimal Path Deduction Process

In order to make the path lies in the center of the desirable structure, the potential is defined as an awarding function $f$ as follows. V can be considered as a grid graph that the vertices are voxels and the edges are defined by the 26-neighborhood in V. $\forall p \in V$ and its neighbor q, there is an edge defined by the pair of connected vertices (p,q), $f(p,q)$ satisfies the conditions:

1) $f(p,q)<0$ if $q \in S_k$, for some k, otherwise, it equals 0

2) Let $\text{Dis}_{Euclidean}(p,q)$ be the Euclidean distance between p and q. $\lambda|f(p, q)|<\text{Dis}_{Euclidean}(p, q)$, $\forall q \in S_k$, for some k. Under the second restriction, it can be guaranteed that there are no negative edges in the weighted grid graph of V.

By applying the awarding function to deduce the minimal path from a given source point, s is as follows. From the given source point, s, the well-known Dijkstra's algorithm is applied to calculate the single source shortest paths to all the other end points, $t_j \in E^0$. The following steps are iteratively performed. After each iteration, some candidate end points are removed from $E^i$ to form the $E^{i+1}$, $i \geq 0$.

1. The longest path is picked among all of the minimal paths $P_{s,1_j}$, $t_j \in E^i$.

2. Note that there could be candidate end points in $E^i$ that are close to $P_{s,1_j}$.

These candidate end points are considered redundant and can be removed. These redundant end points are removed by $E^{i+1}=E^i/(P_{s,t_i} \oplus T)$, where $\oplus$ is the Minkowski addition and T is a template structure. When $E^i=\phi$, the algorithm terminate.

Polygonal Path Approximation

Since the approximated centerline derived by applying the awarding functions is not smooth, (see FIG. 17*c*), an approximated polygonal path is made for each branch and at the meanwhile, the branch points are preserved. The approximation method is described below.

Given a polygonal path $S=<v_0, \ldots, v_m>$ and an error bound $\epsilon$, a polygonal path, $\hat{S}$ that is a $\epsilon$-approximation of S is looked for. $\hat{S}=<u_0, \ldots, u_m>$ optimally $\epsilon$-approximates S if $\hat{S}$ meets the following criteria.

1. Vertex set of $\hat{S}$ is a subset of S.

2. let $u_i=v_j$ and $u_{i+1}=v_k$, $i=1,\ldots,m-1$, the distance between any vertex on the polygonal path $<v_j, \ldots, v_k>$ to the line segment $(u_i, u_{i+1})$ is less than $\epsilon$.

3. The number of the vertices on $\hat{S}$ is the least possible.

This problem can be solved by using the dynamic programming technique.

The number of edges on $\hat{S}_{(i,j)}$ is defined to be its cost. The least cost among all the $\epsilon$-approximation for S is the optimal cost denoted $c(i,j)$. For the boundary condition that $i=j$, let $c(i,j)=1$. If $j>i$, there are two cases to establish the optimal $\epsilon$-approximation path.

Case 1: $\hat{S}_{(i,j)}$ is the line segment $(v_i, v_j)$

This case occurs when all the distances between vertices $v_k$, $i \leq k \leq j$, to $(v_i, v_j)$ are less than $\epsilon \cdot (v_i, v_j)$ $\epsilon$-approximates $<v_i, v_{i+1}, \ldots, v_j>$ and thus $c(i, j)=1$.

Case 2: $\hat{S}_{(i,j)}$ consists of two or more line segments.

In this case, $\hat{S}_{(i,j)}$ can be divided into two sub-path $\hat{S}_{(i,k)}$ and $\hat{S}_{(k,j)}$ where $v_k$ is a vertex on $<v_i, \ldots, v_j>$. Note that both $\hat{S}_{(i,k)}$ and $\hat{S}_{(k,j)}$ $\epsilon$-approximate polygonal paths $<v_i, \ldots, v_k>$ and $<v_k, \ldots, v_j>$. The cost for optimal $\epsilon$-approximation $c(i, j)$ is $\min_{i<k<j}(c(i,k)+c(k,j))$ Based on the above discussion, the optimal cost can be written in the recurrence.

$$c(i,i)=1$$

$$c(i,j)=1 \text{ if } (v_i,v_j) \text{ } \epsilon\text{-approximates } <v_i, \ldots, v_j>$$

$$c(i,j)=\min_{i<j<k}(c(i,k)+c(k,j)) \quad (18)$$

And the optimal solution is obtained in a bottom-up manner.

Experimental Results

The Data Sets

All of the data were acquired in the Brain Research Center, National Tsing Hua University, Hsin-Chu with a Zeiss LSM 510 confocal microscope. The mean voxel sizes for a Drosophila's projection neuron image stack are 0.17×0.17×1.0 μm³.

Evaluation of the Proposed Method

In our experiment, $\lambda=1.0$, $w=1.0$ is set and the template T, is a box with sizes 5×5×3 and the awarding functions is simply $$f(p,q)=-0.5 \text{ if } q \in S_k \text{ for some } k. \qquad (19)$$

Figure 17A:
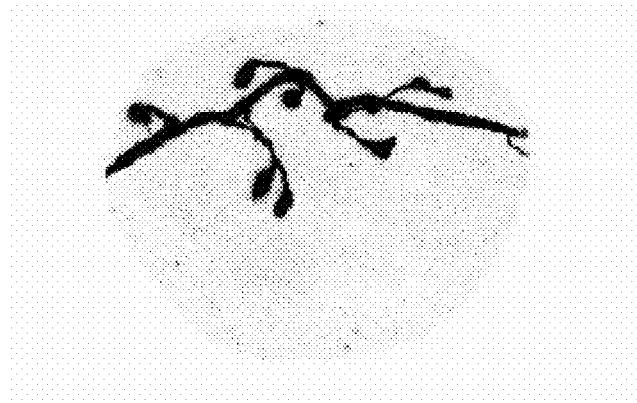
FIG. 17a illustrates the maximum intensity projection (MIP) of the original image stack in accordance with the present invention.
Figure 17B:
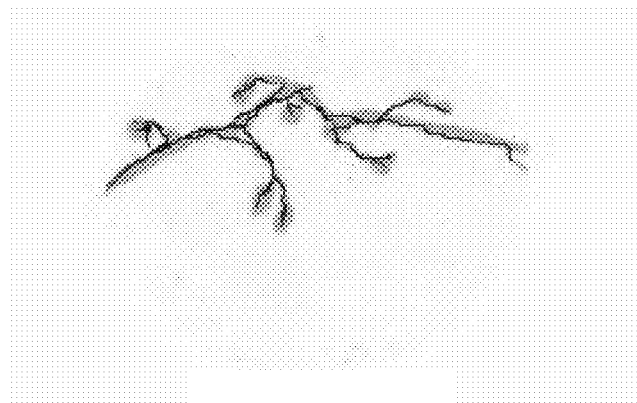
FIG. 17b illustrates the neuron tracing result without using the rewarding function in accordance with the present invention.
Figure 17C:
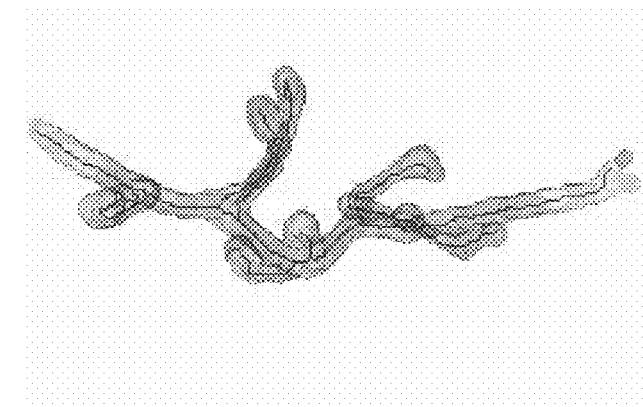
FIG. 17c illustrates the tracing result with the rewarding function applied in accordance with the present invention.
Figure 17D:
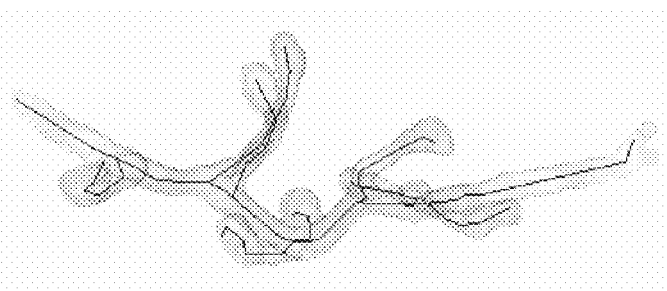
FIG. 17d illustrates the $\epsilon$-approximation of the tracing result shown in FIG. 17c, wherein $\epsilon=\sqrt{2}$ in accordance with the present invention.
Figure 18:
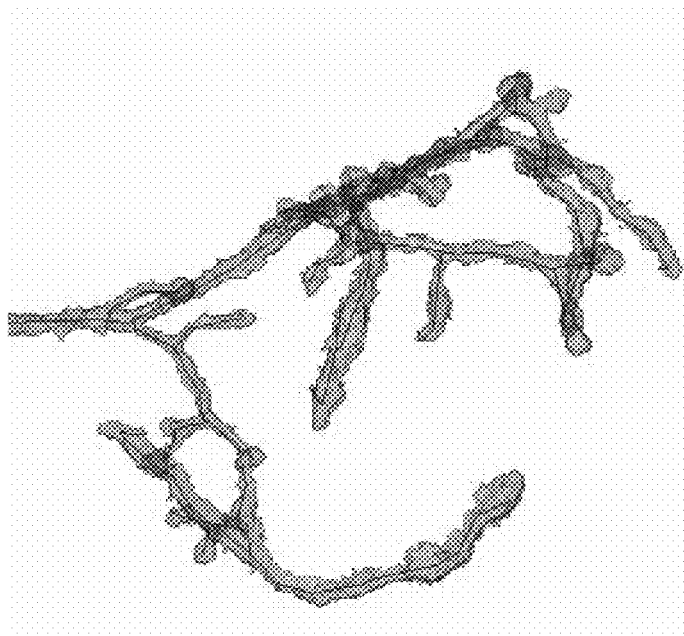
FIG. 18 illustrates the $\epsilon$-approximation, $\epsilon=\sqrt{2}$, of the Drosophila's projection neuron in the lateral horn in accordance with the present invention.

Although this awarding function looks naïve, the result is good. In FIGS. 17*a*-17*d*, the maximum intensity projection (MIP) of the original data and the traced result is presented when the awarding function is applied. FIGS. 17*a*-17*d* show the projection neuron in *Drosophila*'s calyx. FIG. 17*a* shows the maximum intensity projection (MIP) of the original image stack. FIG. 17*b* shows the neuron tracing result without using the rewarding function. In FIG. 17*b*, the tracing result is drawn in black lines and is overlapped to the MIP of the original data which is drawn in gray. Black lines in FIG. 17*c* show the tracing result with the rewarding function applied. FIG. 17*d* shows the ε-approximation of the tracing result in FIG. 17*c*, wherein $\epsilon=\sqrt{2}$. Both FIGS. 17*c* and 17*d* are rendered by directed volume rendering. The voxel size is 0.18×0.18×1.0 μm³. In FIG. 18, the ε-approximated centerline of a more complicated structure, the projection neuron in *Drosophila*'s lateral horn is presented. FIG. 18 shows the ε-approximation, $\epsilon=\sqrt{2}$, of the *Drosophila*'s projection neuron in the lateral horn. The black lines are tracking results. FIG. 18 is rendered by directed volume rendering. The voxel size is 0.16×0.16×1.0 μm³.

Therefore, the present invention provides the aforementioned image preprocessing system which can be utilized to establish a 3D insect brain image database system, for example a 3D *Drosophila* brain image database system, to explore the inner structures of the insect brain, for example the Drosophila brain.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. An image preprocessing system, comprising:
a processing unit;
an image preprocessing unit coupled to said processing unit to preprocess image slice data, wherein said image preprocessing unit comprises an image fusion module to estimate missing values between different said image slice data, an image stitching module to stitch different said image slice data into stitched image data and a neuronal tracing module to trace centerlines of neurons in said stitched image data through an awarding function, a minimal path deduction process, a polygonal path approximation process or the combination thereof; and
a database coupled to said processing unit to store said preprocessed image slice data.

2. The system of claim 1, wherein said image fusion module utilizes a Registration-based Shape-Based Interpolation.

3. The system of claim 1, wherein said image fusion module comprises an image registration module.

4. The system of claim 3, wherein said image registration module comprises a metric component.

5. The system of claim 3, wherein said image registration module comprises an interpolator component.

6. The system of claim 3, wherein said image registration module comprises a transform component.

7. The system of claim 3, wherein said image registration module comprises an optimizer component.

8. The system of claim 1, wherein said image fusion module comprises a gray-level shape-based interpolation module.

9. The system of claim 1, wherein said image stitching module comprises a series of algorithms, wherein said algorithms comprise pyramidal correlation, adjacency adjustment, gain compensation for entire images and multi-band blending.

10. The system of claim 1, wherein said image preprocessing unit further comprises a standardizing module to generate a standard coordinate for said stitched image data.

11. The system of claim 10, wherein said standardizing module comprises:
a process system used to process data;
an average model generating module embedded in a computing system, wherein while an input of two-dimensional individual model sections is fed into said process system, said average model generating module is responsive to said input of two-dimensional individual model sections and is capable of processing an individual model construction and model-averaging procedure, thereby generating an average model from all the input datasets;
a standardization database including a bio-expression sub-database, cellular network sub-database and bio-fine structure sub-database, wherein said standardization database is coupled to said process system to store at least said average model; and
a module for creating standard brain model and coordinate system.

12. The system of claim 10, wherein said image preprocessing unit further comprises an automatic aligning module to align said stitched image data with a standard image and combine said aligned image data with said standard coordinate generated by said standardizing module.

* * * * *